June 22, 1954     A. H. LAMB     2,681,572
RELATIVE HUMIDITY INDICATOR
Filed July 5, 1950     2 Sheets-Sheet 1
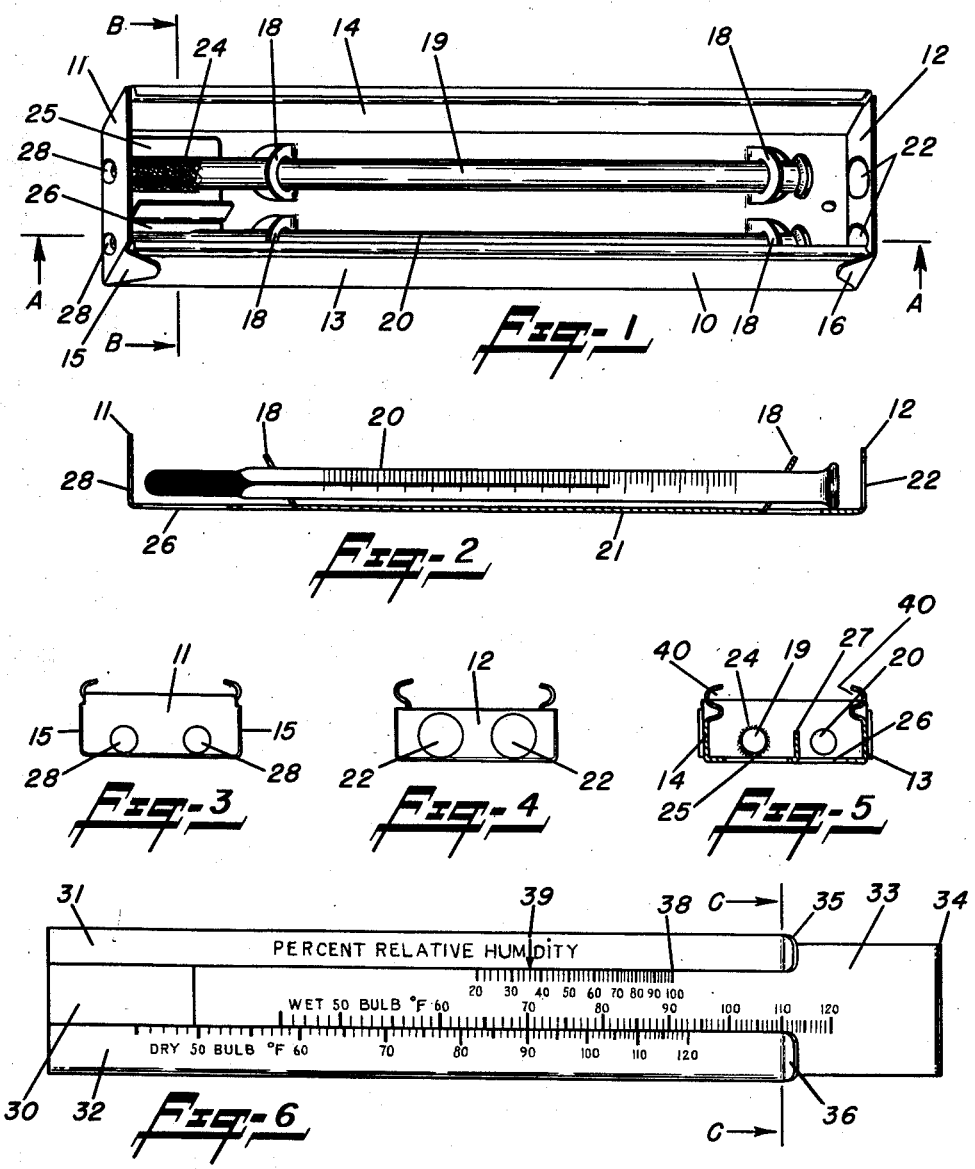
ANTHONY H. LAMB
INVENTOR.

June 22, 1954     A. H. LAMB     2,681,572
RELATIVE HUMIDITY INDICATOR
Filed July 5, 1950     2 Sheets-Sheet 2
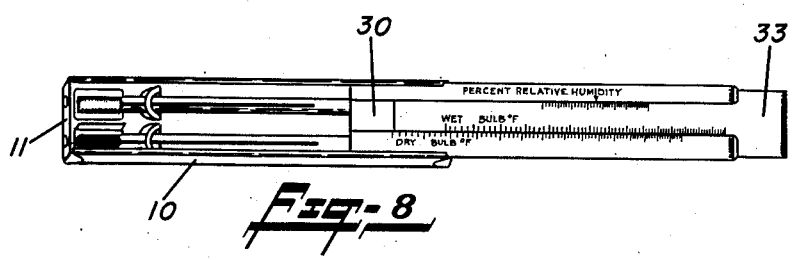
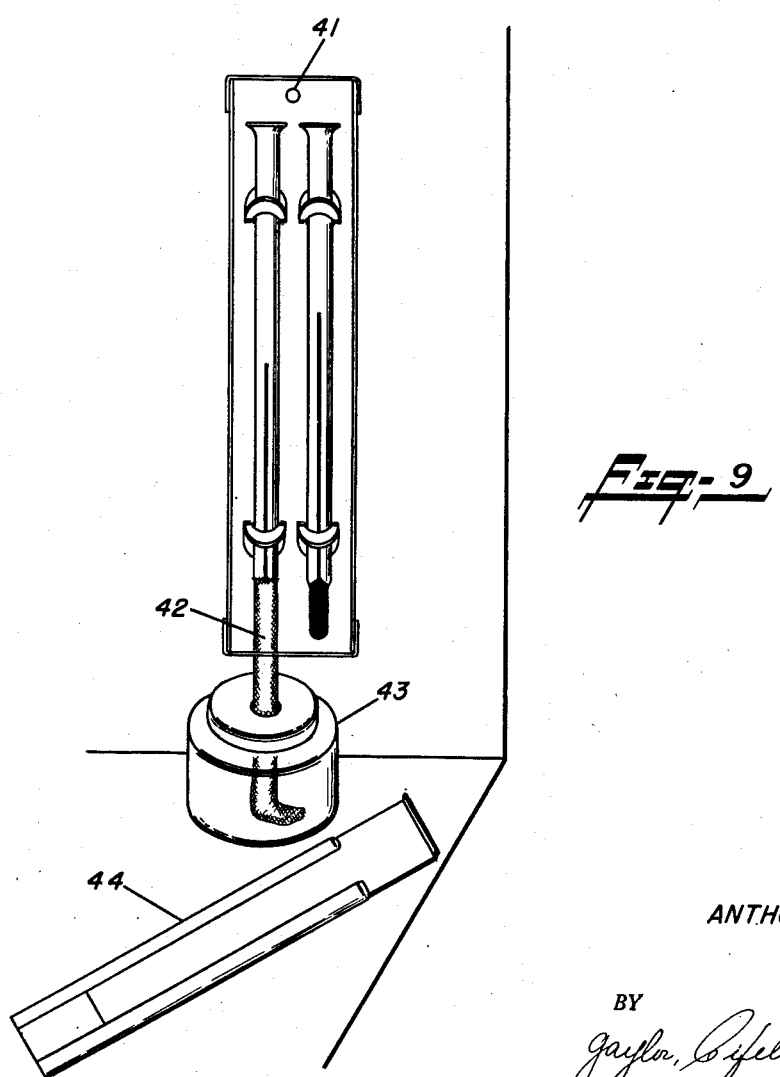
ANTHONY H. LAMB
INVENTOR.
BY
ATTORNEYS Patented June 22, 1954

2,681,572

UNITED STATES PATENT OFFICE 2,681,572

RELATIVE HUMIDITY INDICATOR

Anthony H. Lamb, Hillside, N. J., assignor to Weston Electrical Instrument Corporation, Newark, N. J., a corporation of New Jersey Application July 5, 1950, Serial No. 172,120

2 Claims. (Cl. 73—338)

1

This invention relates to relative humidity indicators and more particularly to a small portable relative humidity indicator of rugged construction and high accuracy.

The conventional portable instrument for determining relative humidity with close accuracy is the "sling psychrometer" which comprises a wet and a dry bulb thermometer of the mercury type on a supporting strip that is pivotally connected to a staff or handle by which the user rotates the thermometer assembly to promote the evaporation of water from the wet wick of the wet bulb thermometer. The relative humidity for any given set of temperature readings is determined from a chart. Portable hygrometers with hair, or other moisture absorbing filaments, as the humidity-responsive element are of relatively low accuracy and stability of calibration, and are not of practical utility in applications where the relative humidity is to be measured with an accuracy of ±5% or better.

A device made in accordance with this invention operates on the principle of determining relative humidity by the accurate wet and dry bulb method and all components either fit into, or form part of, a small plastic case. The device includes two etched-scale glass thermometers individually hand calibrated for permanently accurate readings, and the spirit columns of the thermometers are of different readily-distinguishable colors, for example, blue for the wet bulb thermometer and red for the dry bulb thermometer. A simple slide-rule calculator forms a removable part of the case, said calculator carrying two temperature scales printed in colors corresponding to the colors of the thermometer spirit columns. In use, a few drops of water are applied to the wick of the wet bulb thermometer and the instrument is either fanned, or gently swung in air, for a few minutes. A setting of the wet bulb and dry bulb readings on the slide-rule calculator provides a direct reading of the relatively humidity. While the device may be mounted on a wall it is of small, compact form and can conveniently be carried in one's pocket.

An object of this invention is the provision of a relative-humidity indicator of novel construction, simple to use and economical to produce.

An object of this invention is the provision of a portable hygrometer which is mechanically rugged, of high, permanent accuracy and of pocket size.

An object of this invention is the provision of a portable hygrometer comprising a case, two thermometers removably disposed in said case, a wick over the bulb of one thermometer, and a slide-rule calculator forming a removable closure for the case, said calculator carrying wet and dry bulb temperature scales and a scale of relative-humidity values.

An object of this invention is the provision of a hygrometer comprising a case; resilient mounting means in said case; a pair of glass thermometers removably retained within the case by the resilient mounting means, said thermometers having spirit columns of different colors; a calculator removably carried by the case, said calculator having temperature scales matching the colors of the thermometer spirit columns and a scale of relative humidity values.

An object of this invention is the provision of a pocket-size hygrometer comprising an elongated case having aligned apertures in the end walls, integral tabs formed in the bottom of the case, said tabs having apertures aligned with the apertures in one of the end walls, glass thermometers disposed within the tab apertures, said thermometers having spirit columns of different colors, a wick over the bulb of one thermometer, opposed channels formed in the side walls of the case, a slide-rule calculator slidable within the said channels, relatively-displaceable temperature scales carried by the calculator, said scales matching the colors of the spirit columns of the thermometers, a scale of relative-humidity values carried by the calculator, and a reference mark alignable with the scale of humidity values upon relative displacement of the said temperature scales.

These and other objects and advantages will be apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views:

Figure 1 is an isometric view showing the two glass thermometers disposed within the case;

Figure 2 is a cross-sectional view taken along the line A—A of Figure 1 and shows the integral tabs, formed in the bottom of the case, for retaining the thermometers in position;

Figure 3 is an elevation view showing one end of the case;

Figure 4 is an elevation view showing the other end of the case;

Figure 5 is a transverse, cross-sectional view taken along the line B—B of Figure 1;

Figure 6 is a plan view of the slide-rule calculator;

Figure 7 is a transverse, cross-sectional view taken along the line C—C of Figure 6; and drawn to an enlarged scale;

Figure 8 is a plan view illustrating the complete device with the slide-rule calculator in place on the case; and Figure 9 illustrates the device mounted on a wall.

Referring now to Figures 1 to 5, the numeral 10 identifies the case which may be formed of a single sheet of material, such as Vinylite plastic, having upturned end walls 11, 12 and upturned side walls 13 and 14. The ends 11, 12 include tabs 15, 16 that are cemented to the side walls to form a mechanically rugged assembly. The bottom of the case is die-cut to provide the four integral, upwardly extending tabs 18, each tab having an aperture to accommodate the glass thermometers 19 and 20. As shown in the cross-sectional view of Figure 2, the thermometers, as supported by the tabs 18, are spaced from the bottom 21 of the case and the thermometers may be inserted into the case, or removed therefrom, through the relatively large apertures 22 in the case end wall 12 (see also Figure 4). This construction offers several advantages:

1. One or both thermometers may conveniently be removed from the case and used for general temperature measurement;

2. It affords free circulation of air around the thermometers to provide accurate temperature indications; and 3. The resilient tabs serve to protect the thermometers from damage by mechanical shock.

The glass thermometers are of the etched-stem, individually, hand-calibrated type for permanently accurate readings and I prefer to make the spirit columns of different colors to eliminate erroneous settings of the calculator, as will be described in detail hereinbelow. Thus, the spirit column of wet bulb thermometer 19, carrying the removable wick 24, is colored blue and that of the dry bulb thermometer 20 is colored red. To further promote the flow of air around the thermometer bulbs, the base of the case is provided with the openings 25, 26. As shown in Figure 5, the opening 25 is formed by punching out a portion of the base material, whereas the opening 26 is formed by die-cutting the base and bending the material upward to provide the wall 27 that serves as a partition for added protection of the thermometer bulbs. Also, the end wall 11 includes the apertures 28, each aligned with an end of a thermometer. These apertures have a diameter equal to that of the bulb section of the thermometers. Consequently, they serve not only to promote air flow to the bulbs but they also act to prevent breakage of the very thin-walled bulb section when the case is subjected to an impact force such as may cause the thermometers to slide toward the end wall 11. Under such condition the tip of the bulb section of the thermometer will pass through the associated aperture 28 and the wall defining the aperture will frictionally engage the bulb surface.

In use the wick 24 is moistened and the device is swung back and forth to cause a circulation of air through the various openings in the case in the vicinity of the thermometer bulbs. As is well known, the evaporation of moisture from the wick 24 produces a reading of the wet bulb thermometer below that of the free air thermometer 20 and the difference between these two readings is dependent upon the relative humidity of the air. A slide-rule type of calculator may be employed to translate the wet and dry bulb thermometer readings directly into relative humidity values.

The calculator is shown in Figures 6 and 7. It comprises a member 30 having the longitudinal edges 31, 32 folded over to form a race for the slider 33. For convenience in use, the slider has an upturned end forming a tab 34 and the ends of the edge members 31, 32 are likewise upturned to form the tabs 35, 36. The surface of the edge member 32 carries a graduated scale of temperature values and the associated notation "Dry Bulb ° F." A similarly calibrated scale of temperature values is carried by the slider and is identified by the notation "Wet Bulb ° F." These scales are of like calibration so that when the tab 34 of the slider is moved up against the tabs 35, 36, all points on these scales will be in exact alignment. To reduce the possibility of error in setting the scales relative to each other, by moving the slider, the notation "Wet Bulb ° F." and the associated temperature scale carried by the slider is printed in blue corresponding to the blue spirit column of the wet bulb thermometer, and the notation "Dry Bulb ° F." and the associated temperature scale carried by the folded-edge member 32 is printed in red corresponding to the red spirit column of the dry bulb thermometer.

The slider 33 also carries a calibrated scale 38 of relative humidity values, which scale is associated with a fixed reference mark 39 carried by the folded-over edge 31 and identified by the notation "Per Cent Relative Humidity." It will be apparent that when the wet bulb temperature is set exactly opposite the dry bulb temperature the correct per cent relative humidity will appear directly below the reference arrow 39. As shown in Figure 6, a wet bulb reading of 70 has been aligned with a dry bulb reading of 90, and the reference arrow 39 indicates the correct relative humidity for these readings, namely 36%.

Although the calculator forms a separate unit, as shown in Figure 6, the device is so constructed that the calculator forms a closure for the case. The calculator, as a unit, is slidable within opposed channels 40 formed by folding over the upper portions of the side walls 13, 14 of the case 10, as shown in the transverse, cross-sectional view of Figure 5. Figure 8 shows the complete device with the calculator unit partially extended from the case 10 and the slider 33 partially extended from the calculator member 30. When the slider 33 is in the fully closed or retracted position and the calculator unit is moved inwardly with respect to the case until the forward edge thereof strikes the inner surface of the end 11 of the case, the thermometers are completely enclosed and, therefore, protected against damage.

While the hygrometer, above described, is adapted for convenient carrying in one's pocket for the accurate determination of relative humidity, it can also be used as a continuous humidity indicator, as shown in Figure 9. A small hole 41 in the bottom of the case may be used to mount the device on a wall and a relatively long wick 42 extends from the thermometer bulb into a jar 43 containing water. The calculator unit 44 may be removed from the case or it may be retained on the case, as shown in Figure 8.

Having now described my invention in detail in accordance with the patent statutes, various changes and modifications will suggest themselves to those skilled in this art and it is intended that such changes and modifications shall fall within the spirit and scope of the invention as recited in the following claims.

I claim:

1. A housing for a glass thermometer, said housing being formed of sheet plastic material and comprising a substantially rectangular base; integral end walls extending upwardly from the base; integral side walls extending upwardly from the base, said side walls including upper portions extending above the said end walls and formed into opposed channels; a set of alined tabs formed integral with the base and extending upwardly therefrom in diverging planes, each tab having an aperture therein; one of said end walls having an opening alined with the apertures in the tabs; the recited arrangement being such that a glass thermometer can be inserted into the housing through the said opening and apertures and such thermometer will be frictionally retained in relatively-fixed position within the housing by reason of contact between the surface of the thermometer and at least a portion of the walls defining the apertures in the diverging tabs.

2. A device for determining relative humidity comprising a base made of a sheet of plastic material; integral end walls extending upwardly from the base, one of said end walls including a pair of openings; integral side walls extending upwardly from the base, said side walls including portions extending beyond the end walls and formed into opposed channels; a first set of tabs each having an aperture therein, said tabs being formed integral with the base and extending upwardly therefrom in diverging planes and said apertures being alined with one of the openings in the end wall; a second set of tabs each having an aperture therein, said tabs being formed integral with the base and extending upwardly therefrom in diverging planes, and said apertures being alined with the other opening in the end wall; a pair of glass thermometers extending through the apertures in each set of tabs and disposed between the said end walls, said thermometers having an outside diameter less than that of the said openings in the end wall and different-colored spirit columns; a wick surrounding the bulb of one of the thermometers; there being openings in said base at the bulbs of the thermometers; a closure member made of a sheet of plastic material, said closure member having a flat bottom portion and folded-over side sections slidable in the said channels; a first scale of temperature values on the outer surface of one of the said folded-over side sections, said scale having a color corresponding to that of one of the thermometer spirit columns; a fixed reference mark on the outer surface of the other said folded-over side section; a slider slidable between the bottom portion and the folded-over side sections of the closure member; a second scale of temperature values on the slider and associated with the first scale of temperature values, said second scale having a color corresponding to that of the other thermometer spirit column; and a scale of relative humidity values on the slider and associated with the said reference mark.

References Cited in the file of this patent

UNITED STATES PATENTS

| Number | Name | Date |
|---|---|---|
| 834,660 | Cowling | Oct. 30, 1906 |
| 1,525,752 | Larkey | Feb. 10, 1925 |
| 1,579,706 | Hodge | Apr. 6, 1926 |
| 1,892,012 | Seehase | Dec. 27, 1932 |
| 2,021,283 | Bolton | Nov. 19, 1935 |
| 2,024,984 | Bradley | Dec. 17, 1935 |
| 2,073,421 | Komorous | Mar. 9, 1937 |
| 2,260,245 | Wappner | Oct. 21, 1941 |

FOREIGN PATENTS

| Number | Country | Date |
|---|---|---|
| 165,881 | Switzerland | Dec. 15, 1933 |